(12) United States Patent
Hahn et al.

(10) Patent No.: US 9,487,229 B2
(45) Date of Patent: Nov. 8, 2016

(54) STEERING COLUMN FOR A MOTOR VEHICLE

(71) Applicant: THYSSENKRUPP PRESTA AG, Eschen (LI)

(72) Inventors: Michael Hahn, Au (CH); Martin Fleischer, Balgach (CH); Paul Schwarzhans, Fedlkirch (AT)

(73) Assignee: THYSSENKRUPP PRESTA AG, Eschen (LI)

( * ) Notice: Subject to any disclaimer, the term of this patent is extended or adjusted under 35 U.S.C. 154(b) by 0 days.

(21) Appl. No.: 14/652,972

(22) PCT Filed: Sep. 25, 2013

(86) PCT No.: PCT/EP2013/002868
§ 371 (c)(1),
(2) Date: Aug. 13, 2015

(87) PCT Pub. No.: WO2014/094926
PCT Pub. Date: Jun. 26, 2014

(65) Prior Publication Data
US 2016/0244084 A1    Aug. 25, 2016

(30) Foreign Application Priority Data

Dec. 21, 2012  (DE) ......................... 10 2012 112 890

(51) Int. Cl.
*B62D 1/184*    (2006.01)
(52) U.S. Cl.
CPC ..................... *B62D 1/184* (2013.01)
(58) Field of Classification Search
CPC ....................................................... B62D 1/184
See application file for complete search history.

(56) References Cited

U.S. PATENT DOCUMENTS

| 2009/0019963 | A1* | 1/2009 | Hubrecht | B62D 1/184 74/493 |
| 2011/0064538 | A1* | 3/2011 | Oertle | B62D 1/184 411/360 |
| 2011/0156380 | A1* | 6/2011 | Dietz | B60R 21/09 280/775 |
| 2012/0318093 | A1* | 12/2012 | Huber | B62D 1/184 74/493 |
| 2014/0305251 | A1* | 10/2014 | Wilkes | B62D 1/184 74/493 |
| 2016/0144886 | A1* | 5/2016 | Tomiyama | B62D 1/187 74/493 |

FOREIGN PATENT DOCUMENTS

| DE | 425879 | 3/1926 |
| WO | 2011100770 | 8/2011 |

OTHER PUBLICATIONS

PCT International Search Report mailed Dec. 11, 2013 for PCT International Application No. PCT/EP2013/002868 with English Translation, 5 pages.

* cited by examiner

*Primary Examiner* — Drew Brown
(74) *Attorney, Agent, or Firm* — Remarck Law Group PLC

(57) ABSTRACT

A clamping device for an adjustable steering column for a motor vehicle comprises a clamping bolt which is rotatable about its longitudinal axis for the opening and closing of the clamping device by means of an actuation lever, through an opening of which the clamping bolt extends. In the region of the opening of the actuation lever there is situated a connecting section of the clamping bolt, over the axial extent of which connecting section the clamping bolt is connected to the actuation lever by way of a press fit. The outer wall of the clamping bolt has, in the connecting section of the clamping bolt, at least two pressing regions which are spaced apart in the circumferential direction about the longitudinal axis and by way of which the actuation lever is pressed against the outer wall.

15 Claims, 4 Drawing Sheets

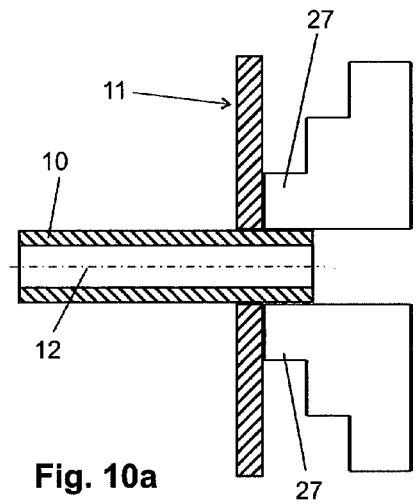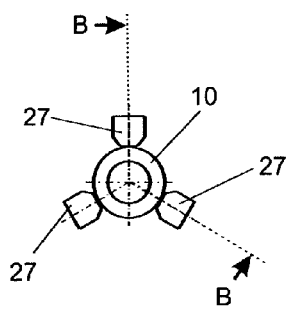
Fig. 10a  Fig. 10b
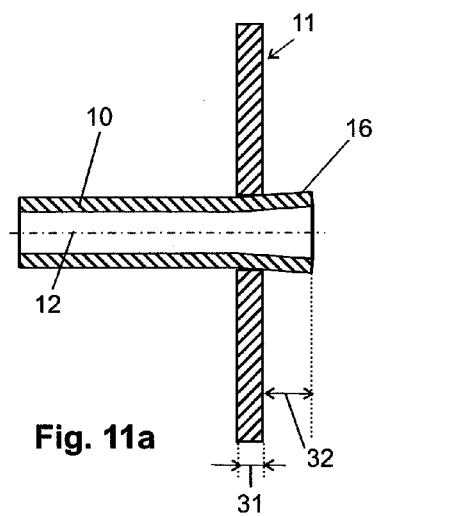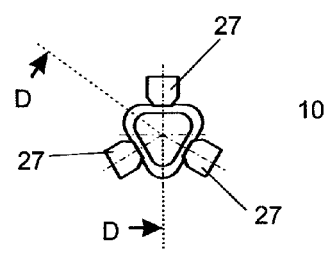
Fig. 11a  Fig. 11b
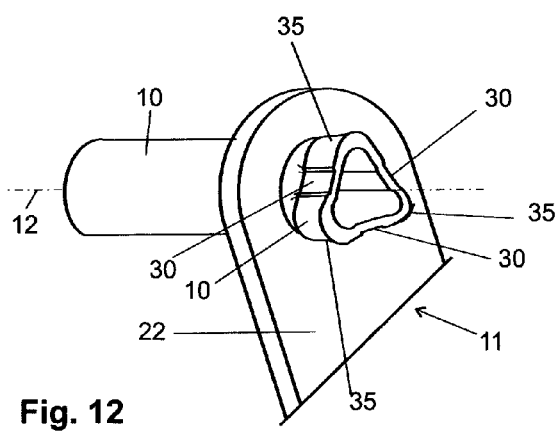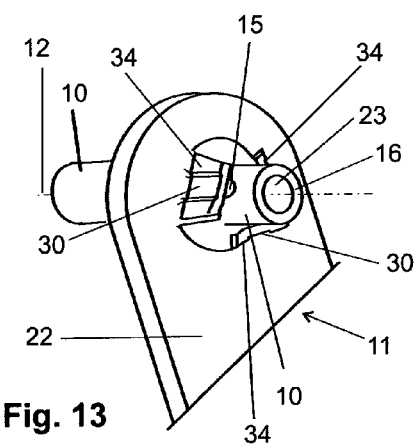
Fig. 12  Fig. 13

STEERING COLUMN FOR A MOTOR VEHICLE

CROSS-REFERENCE TO RELATED APPLICATIONS

This application is a 371 U.S. National Stage of International Application No. PCT/EP2013/002868, filed Sep. 25, 2013, which claims priority to German Application No. DE102012112890.1 filed on Dec. 21, 2012. The disclosure of each of the above applications is incorporated herein by reference in their entirety.

FIELD

The present disclosure relates to a steering column for a motor vehicle, having a clamping device, in the open state of which the position of the steering column is adjustable and in the closed state of which the position of the steering column is fixed.

BACKGROUND

WO 2011/100770 A1 has disclosed a steering column of the type mentioned in the introduction, which steering column has a clamping bolt which is rotatable about its longitudinal axis and which is equipped with a toothing encircling the longitudinal axis of the clamping bolt. An actuation lever is pressed axially, by way of a joining surface which is composed of plastic and which encircles the longitudinal axis of the clamping bolt, onto the toothing of the clamping bolt, wherein the teeth of the toothing at least partially dig into the joining surface. During this axial pressing-on process, a relatively high axial force acts on the clamping device, whereby a certain amount of deformation may arise in the clamping device, such that desired small tolerances are not adhered to, or even retroactive adjustments are necessary.

WO 2010/022855 A1 has disclosed the connection of an actuation lever of a clamping device to a clamping piece which is rotated by the actuation lever during the opening and closing movements, wherein the connection permits a rotation between the actuation lever and the clamping piece if a torque acting between the actuation lever and the clamping piece exceeds a threshold value. Said connection may be a positively locking and/or non-positively locking connection.

U.S. Pat. No. 4,990,021 A presents a positively locking connection of an actuation lever to the clamping device of a steering column. EP 0 661 474 B1 has disclosed a positively locking shaft or shank fastening in a bore of a receiving part.

U.S. Pat. No. 4,402,236 A presents a connection of an actuation lever to a clamping bolt of a clamping device by means of a screw connection and press fit.

SUMMARY

The steering column comprises a clamping bolt, which clamping bolt has a longitudinal axis, first and second ends which delimit the clamping bolt in an axial direction, and an outer wall which delimits the clamping bolt in a radial direction. The clamping bolt is rotatable about its longitudinal axis for the opening and closing of the clamping device by means of an actuation lever, through an opening of which the clamping bolt extends. The clamping bolt has an end section adjoining its first end and has a connecting section which adjoins the end section in the direction of the second end of the clamping bolt and which is situated in the region of the opening of the actuation lever and in the axial extent of which the clamping bolt is connected to the actuation lever by way of a press fit. The disclosure also relates to a method for producing a steering column for a motor vehicle having a clamping device, in the open state of which the position of the steering column is adjustable and in the closed state of which the position of the steering column is fixed and which comprises a clamping bolt.

It is an object of the invention to provide a steering column and a method of the type mentioned in the introduction, wherein simple assembly and low axial loading of the clamping device are attained. This is achieved according to the invention by way of a steering column having the features of claim 1 and by way of a method having the features of claim 10.

In the case of a steering column according to the invention, the outer wall of the clamping bolt has, in the connecting section of the clamping bolt, at least two pressing regions which are spaced apart in the circumferential direction of the clamping bolt (=in the direction of rotation about the longitudinal axis of the clamping bolt) and over the extent of which the actuation lever is pressed against the outer wall of the clamping bolt. As viewed in a longitudinal central section running through the pressing region, the outer wall of the clamping bolt has a smaller spacing from the longitudinal axis of the clamping bolt in each pressing region than at least over a part of that end section of the clamping bolt which adjoins the connecting section.

A positively locking connection in the axial direction toward the first end of the clamping bolt is produced in this way.

A press-fit connection of said type can be formed in a simple manner by way of a radial pressing process by means of press jaws which act in the direction of the longitudinal axis of the clamping bolt. Here, it is possible for forces acting on the clamping bolt in an axial direction to be substantially avoided.

It is preferable for precisely three pressing regions to be provided, which are spaced apart in the circumferential direction.

The pressing regions are advantageously distributed uniformly over the circumference, that is to say the angular spacing between successive pressing regions in the circumferential direction is uniform.

The clamping bolt is preferably of hollow form at least over the end section and the connecting section. Said clamping bolt thus has an internal axial cavity (=channel), that is to say the clamping bolt is in the form of a hollow shaft at least over the end section and the connecting section. The clamping bolt is advantageously of hollow form beyond the connecting section, that is to say also over a section of the longitudinal extent of the clamping bolt which adjoins the connecting section in the direction of the second end of the clamping bolt. For example, the clamping bolt is of hollow form over a length adjoining the connecting section in the direction of the second end, said length amounting to less than the sum of the length of the end section and the length of the connecting section, or the clamping bolt is entirely (=over its entire length) of hollow form.

In an advantageous embodiment, the pressing regions form depressions, which are spaced apart in the circumferential direction of the clamping bolt, in the outer wall. Here, the actuation lever has a collar which is pressed against the outer wall of the clamping bolt in the pressing regions, wherein the collar lies at least in sections in the depressions, formed by the pressing regions, in the outer wall. Here, the collar is connected by way of a bend to the base part of the actuation lever, wherein the base part is at right angles to the longitudinal axis of the clamping bolt.

Instead of a collar which encircles the longitudinal axis over the full circumference (=annularly), it would also be possible for the actuation lever to have lugs which are spaced apart in the circumferential direction of the clamping bolt and which are pressed against the outer wall of the clamping bolt in a respective one of the pressing regions, wherein said lugs are situated at least in sections in the respective depression, formed by the pressing region, of the outer wall. In this case, the lugs are connected by way of a bend to a base part of the actuation lever, which base part is at right angles to the longitudinal axis of the clamping bolt.

The engagement of the collar or of the lugs into the depressions which are spaced apart in the circumferential direction of the clamping bolt also serves to realize a positively locking action with respect to a rotation of the actuation lever relative to the clamping bolt about the longitudinal axis of the clamping bolt.

The actuation lever is expediently formed from sheet metal, wherein the thickness of the sheet metal is preferably less than 5 mm at least in the region of the connecting section for connecting to the clamping bolt.

The end section and the connecting section of the clamping bolt constitute mutually adjoining parts of the longitudinal extent of the clamping bolt.

In the method for producing a steering column of the type mentioned in the introduction, it is provided according to the invention that the press fit between the actuation lever and the connecting section of the clamping bolt is formed by way of a radial pressing action by means of press jaws which act in the direction of the longitudinal axis of the clamping bolt. In an advantageous embodiment of the invention, it is provided here that the press jaws act on at least two regions of the actuation lever which are spaced apart in the circumferential direction of the clamping bolt and which are situated radially outside the outer wall of the clamping bolt, and said press jaws press said regions of the actuation lever against pressing regions of the outer wall of the clamping bolt, wherein the regions of the actuation lever and the pressing regions of the outer wall of the clamping bolt are plastically deformed and, in the process, depressions are formed in the outer wall of the clamping bolt, into which depressions the pressed regions of the actuation lever engage. It is expediently the case that, during said pressing process, a pin is inserted into a cavity of the clamping bolt, said pin proceeding from the first end of the clamping bolt and extending in the direction of the longitudinal axis of the clamping bolt. In this case, during the pressing process, the free end of the pin is situated in the region of the end section of the clamping bolt or at the axial location at which the end section ends and the connecting section begins.

DETAILED DESCRIPTION OF THE FIGURES

Further advantages and details of the disclosure will be discussed below on the basis of the appended drawing, in which:

FIG. 10a is a sectional illustration (line BB in FIG. 10b) of a section of the clamping bolt and of the actuation lever according to a second exemplary embodiment of the invention, before the pressing process, together with schematically illustrated press jaws of a press tool, the press jaws having already been applied to the clamping bolt;

FIG. 10b shows an end-side view (viewing direction C in FIG. 10a) of the clamping bolt together with the press jaws;

FIG. 11a is a sectional illustration (along the line DD in FIG. 11b) after the pressing process, with the press jaws omitted;

FIG. 11b shows an end-side view corresponding to FIG. 10b after the pressing process;

FIG. 12 shows an oblique view of the actuation lever connected to the clamping bolt, in the connecting region;

FIG. 13 is an illustration, similar to FIG. 4, of a modification of the first exemplary embodiment of the invention.

DETAILED DESCRIPTION

Figure 1:
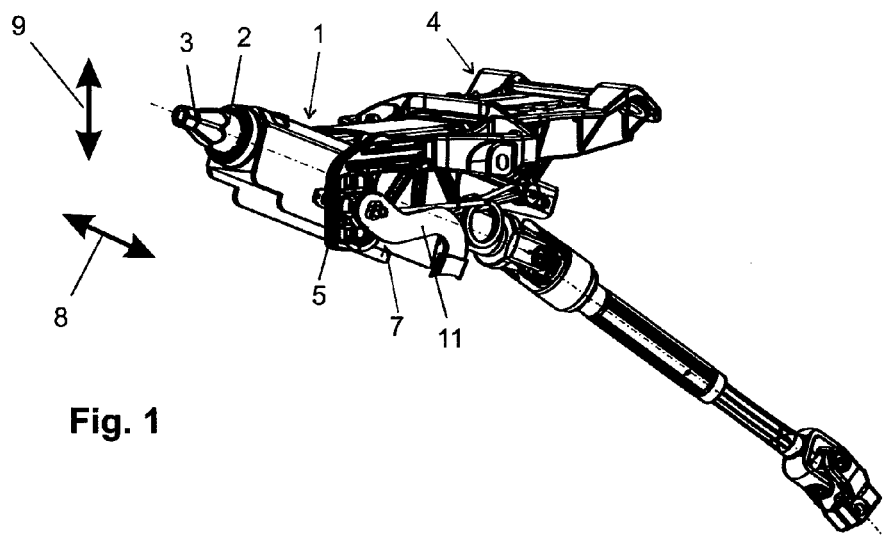
FIG. 1 shows an oblique view of an exemplary embodiment of a steering column according to the invention.
Figure 2:
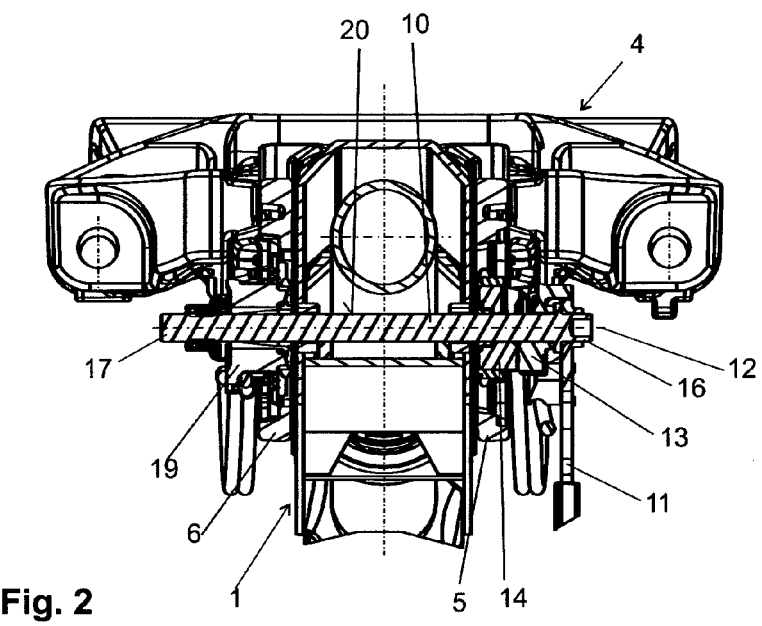
FIG. 2 shows a cross section through the steering column of FIG. 1 in a longitudinal central section through the clamping bolt.
Figure 3:
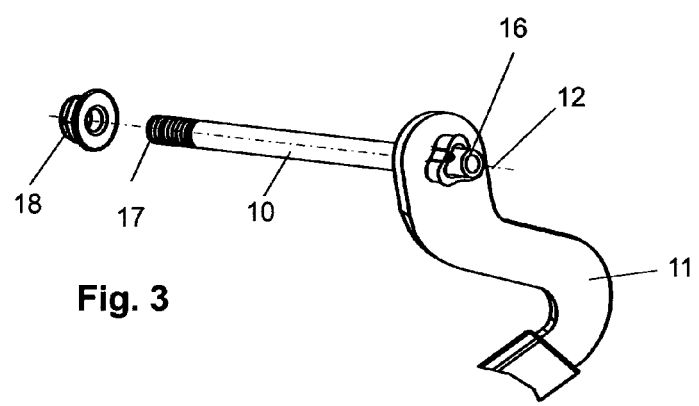
FIG. 3 shows an oblique view of the clamping bolt with the actuation lever connected thereto and with a nut for screwing onto the clamping bolt, with the pressed connection between the actuation lever and the clamping bolt being merely indicated.

A first exemplary embodiment of the invention is illustrated in FIGS. 1 to 9. The steering column comprises a steering spindle 2 which is mounted in rotatable fashion by way of a casing unit 1. A steering wheel (not illustrated) can be fastened to a steering wheel-side end 3 of the steering spindle 2. The casing unit 1 is supported by a support unit 4, which can be installed fixedly with respect to a body. In the exemplary embodiment, the support unit has side members 5, 6 situated to both sides of the casing unit 1. In the closed state of a clamping device 7, the side members 5, 6 are braced against the casing unit 1. The casing unit 1 is thus fixed with respect to the support unit 4. In the open state of the clamping device 7, the casing unit can be adjusted relative to the support unit 4 in an adjustment direction 8 for a length adjustment (in the direction of the axis of the steering spindle 2) and in an adjustment direction 9 for a height or tilt adjustment, in order to permit an adjustment of the position of the steering wheel-side end 3 of the steering spindle 2.

The clamping device 7 comprises a clamping bolt 10, which extends through slots in the side members 5, 6 and in the casing unit 1. The slots in the side members 5, 6 run in the direction of the adjustment direction 9, and the slot in the casing unit 1 runs in the direction of the adjustment device 8.

The clamping bolt 10 is connected rotationally conjointly to an actuation lever 11. The clamping device 7 is opened and closed by way of a rotation of the actuation lever 11 about the longitudinal axis 12 of the clamping bolt 10. For this purpose, a clamping part 13 arranged on the clamping bolt 10 is rotated relative to a counterpart clamping part 14 which is held so as to be rotationally fixed and which is supported on the side member 5. The rotation of the clamping part 13 relative to the counterpart clamping part 14 may be effected for example by way of a connection in terms of drive between the actuation lever 11 and the clamping part 13. For this purpose, recesses (not illustrated) may be provided in the actuation lever 11, which recesses are engaged into by projections of the clamping part 13. Such a connection in terms of drive could also be implemented in some other way, for example also directly between the clamping bolt 10 and the clamping part 13, for example by way of a non-circular contour of the clamping bolt 10 in the region in which the clamping part 13, with a corresponding contour, is arranged on the clamping bolt 10.

For example, the clamping part 13 may be in the form of a cam disk, the cams of which bear against a surface of the counterpart clamping part 14, which is in the form of a cam follower. Another possible design would for example be one in which the clamping part 13 and/or the counterpart clamping part 14 have oblique surfaces on which rolling bodies, for example balls, which are arranged between the clamping part 13 and the counterpart clamping part 14 roll.

The connection of the actuation lever 11 to the clamping bolt 10 is realized in the region of a first end 16 of the clamping bolt 10. The second end 17 of the clamping bolt 10 is adjoined by an external thread onto which there is screwed a nut 18 which is supported, if appropriate via an intermediate washer 19, on the side member 6. The nut 18 may for example be a nut, composed in particular of plastic, with a thread which is self-cut as said nut is screwed onto the external thread of the clamping bolt 10. It is also possible to use a nut 18, composed for example of steel, with an already pre-cut thread.

The first and the second end 16, 17 delimit the clamping bolt in the axial direction of its longitudinal axis 12. In the radial direction with respect to the longitudinal axis 12, the clamping bolt 10 is delimited by its outer wall 20 encircling the longitudinal axis 12.

During the closure of the clamping device 7, the counterpart clamping part 14 and the nut 18 are braced against the side members 5, 6, and the latter are thus braced against the casing unit 1, whereby the casing unit 1 is connected in frictionally engaging fashion to the support unit 4.

Steering columns which have the features described above are known in a variety of embodiments. The invention can be used in a variety of steering columns of said type.

It would for example also be possible for the clamping device 7 to be of a modified design. Aside from clamping connections that act by frictional engagement, it would also be possible to use clamping connections in the closed state of which positive locking and/or a combination of frictional engagement and positive locking are generated. Various clamping connections of said type are known which have clamping bolts which, during the opening and closing of the clamping device, are rotated about their longitudinal axis by way of an actuation lever connected rotationally conjointly to the clamping bolt. To form additional friction surfaces, it would for example also be possible to provide lamellae through which the clamping bolt extends.

Between the casing unit 1 and the support unit 4, it would also be possible for there to be provided a pivoting unit which is pivotable relative to the support unit 4 about a horizontal pivot axis which lies perpendicular to the axis of the steering spindle 2. For height or tilt adjustment, said pivoting unit is pivoted relative to the support unit 4 when the clamping device 7 is in the open state. For length adjustment, the casing unit can be adjusted relative to the pivoting unit in the direction of the axis of the steering spindle 2 when the clamping device 7 is in the open state.

It would also be possible for the support unit 4 to have only one side member 5, arranged on one side of the casing unit 1.

For the adjustment in the adjustment direction 8, the steering spindle 2 advantageously has two sections which can be adjusted in telescopic fashion relative to one another, as is known.

In the event of a crash, the steering column can advantageously collapse with absorption of energy, as is likewise known.

For the fastening, according to the invention, of the actuation lever 11 to the clamping bolt 10 in this exemplary embodiment, the actuation lever 11 has a collar 21 which annularly encircles the longitudinal axis 12 of the clamping bolt 10. The collar 21 is connected by way of a bend to a base part 22 of the actuation lever 11, which base part is at right angles to the longitudinal axis 12. In particular, the collar 21 may be formed from the main part 22, which is composed of sheet metal and which was previously planar (flat) in the region of the collar 21, by way of a collar-drawing process.

Figure 5A:
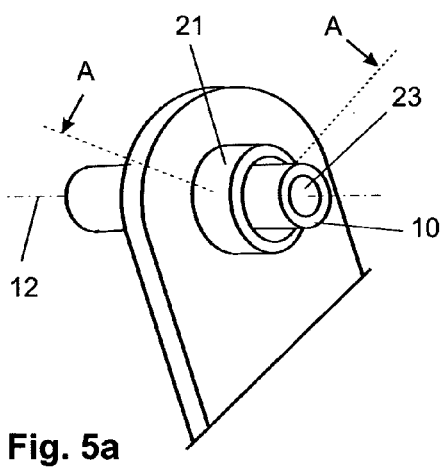
FIG. 5a is an enlarged illustration in the connecting region to the clamping bolt before the connection between actuation lever and clamping bolt.

Before the actuation lever 11 is pressed together with the clamping bolt 10, the collar 21 has a circular ring-shaped contour, as shown in FIG. 5*a*. The wall thickness (=material thickness measured in a radial direction) of the collar 21 lies for example in the range from 1.5 mm to 4 mm.

Figure 5B:
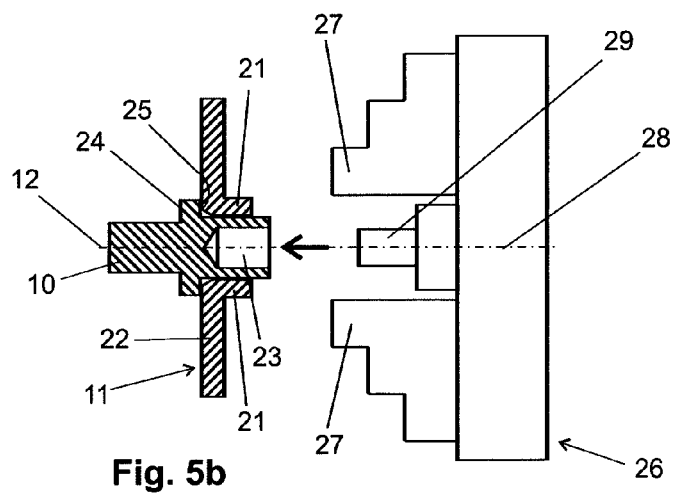
FIG. 5b is a sectional illustration along the line AA in FIG. 5a before the pressing process, together with a schematically illustrated press tool.

For the pressing process, the actuation lever 11 is mounted by way of its opening, which is surrounded by the collar 21, onto the clamping bolt 10, cf. FIG. 5*b*. The collar 21 concentrically surrounds the longitudinal axis 12 and runs parallel to the longitudinal axis 12 as viewed in longitudinal section. Proceeding from the base part 22, the collar 21 extends in the direction of the first end 16 of the clamping bolt 10.

In the section surrounded by the collar 21, the clamping bolt 10 is of hollow form, that is to say has an internal cavity 23 running in an axial direction. The wall surrounding the cavity 23 is situated concentrically with respect to the longitudinal axis 12. The thickness of said wall preferably lies in the range from 1 mm to 3 mm.

The clamping bolt 10 advantageously has a radially outwardly protruding elevation 24, which for example annularly surrounds the clamping bolt. Said elevation forms an abutment shoulder 25 against which the actuation lever 11, at its side averted from the first end 16 of the clamping bolt 10, bears.

A press tool 26 for pressing the actuation lever 11 together with the clamping bolt 10 has three press jaws 27, which are spaced apart uniformly in the circumferential direction about a longitudinal axis 28 of the press tool, and a cylindrical pin 29 which extends in the direction of the longitudinal axis 28 and which is arranged concentrically with respect thereto.

Figure 6:
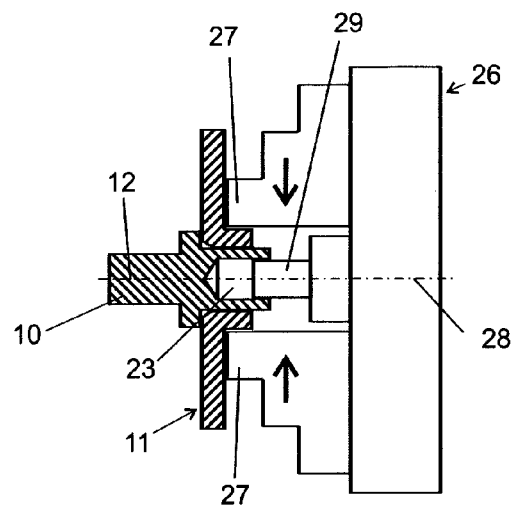
FIG. 6 is a sectional illustration corresponding to FIG. 5b, with the press jaws applied to the annular collar of the actuation lever.

The press tool 26 is pushed by way of its press jaws 27 over the collar 21 of the actuation lever 11, cf. FIGS. 5*b* and 6. Here, the pin 29, also referred to as mandrel, is inserted, with its free end first, into the cavity 23 proceeding from the first end 16 of the clamping bolt 10. Here, the longitudinal axes 12 and 28 lie on a common straight-line. The pin 29 preferably projects into the cavity 23 only to such an extent that it does not overlap the axial extent of the collar 21 in relation to the axial direction of the longitudinal axis 12. The free end of the pin 29 is thus then situated in the region of the end section 32 or at the transition between the end section 32 and the connecting section 31.

The press jaws 27 are then brought together to such an extent that they bear against the collar 21, cf. FIG. 6. Subsequently, the collar 21 is pressed together with the clamping bolt 10 with plastic deformation of the collar 21, and preferably also of the clamping bolt 10, by virtue of the press jaws 27 being brought together further, cf. FIG. 7. During this process, the pin 29 remains in the cavity 23.

Figures 7, 8:
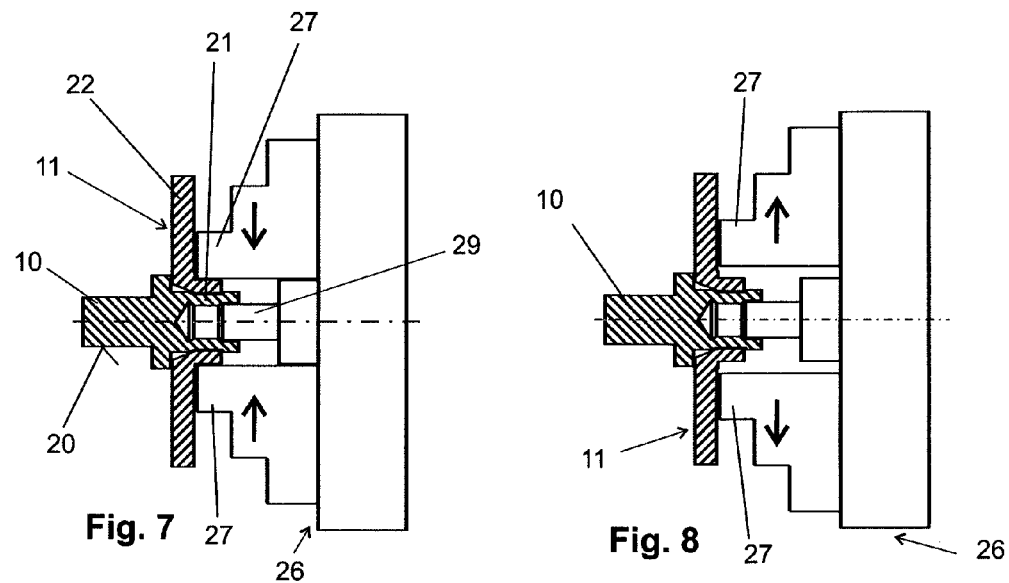
FIG. 7 is a sectional illustration corresponding to FIG. 5b after the pressing process.
FIG. 8 is a sectional illustration corresponding to FIG. 5b, the press jaws having been moved apart again.

Subsequently, the press jaws 27 are moved apart again, cf. FIG. 8, and the press tool is withdrawn in an axial direction, cf. FIG. 9.

Figure 4:
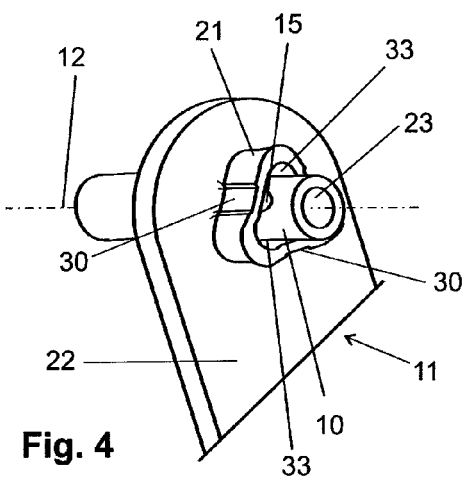
FIG. 4 is an enlarged illustration in the connecting region between the actuation lever which is pressed together with the clamping bolt (the actuation lever being illustrated here in somewhat simplified form)
Figure 9:
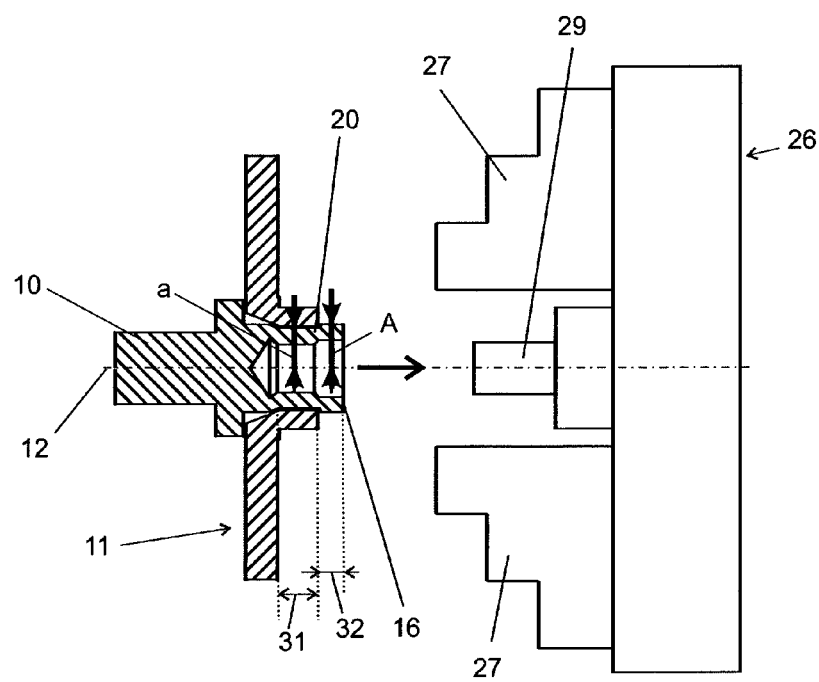
FIG. 9 is a sectional illustration corresponding to FIG. 5b, the press tool having been withdrawn again.

The press connection that is formed can be seen in particular in FIGS. 4 and 9. After the pressing process, the collar 21 has a non-circular circumferential contour at least in the axial region in which it is pressed together with the clamping bolt 10. Said pressed region may be adjoined in the direction of the base part 22 by a non-pressed axial region, which is not illustrated in the figures and which may, even after the pressing process, have an at least substantially circular ring-shaped form, at least directly adjacent to the base part 22.

At the locations where the press jaws have acted, the outer wall of the collar 21 has depressions 30. On the clamping bolt 10, too, there is preferably formed a depression 15, such that the connection is effected not only by non-positive locking but preferably also by way of additional positive locking in the direction of rotation. That section of the axial extent of the clamping bolt 10 over which a pressed connection with the actuation lever 11 is realized is referred to in the present document as the connecting section 31 of the clamping bolt 10. Said connecting section 31 is thus situated in the region of the opening through the actuation lever 11, that is to say, an inner wall of the actuation lever 11, which inner wall surrounds the opening of the actuation lever 11, is situated radially outside the outer wall 20 of the clamping bolt 10. In the exemplary embodiment as per FIGS. 1 to 9, the connecting section 31 is situated in the region of the axial extent of the collar 21.

The connecting section 31 is adjoined, in the direction of the first end 16 of the clamping bolt 10, by an end section 32 of the clamping bolt 10, which end section extends axially as far as the first end 16 of the clamping bolt 10. Over said end section 32, there is no pressed connection between the actuation lever 11 and the clamping bolt 10. The end section 32 and the connecting section 31 thus constitute mutually adjoining sections of the axial extent (=longitudinal extent) of the clamping bolt 10.

By means of the three press jaws 27 which are spaced apart in the circumferential direction about the clamping bolt 10 (=in the direction of rotation about the longitudinal axis 12), the inner wall of the collar 21 is pressed against the outer wall 20 of the clamping bolt 10 over the axial and radial extents of three pressing regions, which are spaced apart in the circumferential direction, of the outer wall 20 of the clamping bolt 10. In these pressing regions of the outer wall 20 only, there is a radial pressed connection between the clamping bolt 10 and the actuation lever 11, that is to say, owing to the elastic preload of the material of the clamping bolt 10 and of the actuation lever 11, a radial bracing action is realized between said two parts.

As viewed in the circumferential direction about the clamping bolt 10 (=direction of rotation about the longitudinal axis 12), between the pressing regions of the outer wall 20, there are situated regions of the outer wall 20 which are not pressed together with the actuation lever 11, that is to say in which there is no radial bracing action between the actuation lever 11 and the outer wall 20. Between successive pressing regions of the outer wall 20 in the circumferential direction (=in the direction of rotation about the longitudinal axis 12), there is in particular in each case a gap 33 between the outer wall 20 and the collar 21 of the actuation lever 11, cf. FIG. 4.

With respect to the axial extent of the clamping bolt 10 (=in the direction of the longitudinal axis 12), on both sides of a respective pressing region, there are situated regions of the outer wall 20 which are not pressed together with the actuation lever 11. In particular, it may be the case that that region which adjoins the pressing regions axially in the direction of the first end 16 of the clamping bolt 10 is no longer surrounded by the actuation lever 11, and a gap is present between the outer wall 20 of the clamping bolt 10 and the actuation lever 11 in that region which axially adjoins the pressing regions in the direction of the second end 17 of the clamping bolt 10 (cf. FIGS. 7 to 9).

As viewed in the longitudinal central section running through a respective pressing region (that is to say with respect to a section, the plane of which encompasses the longitudinal axis 12, through a respective pressing region), the outer wall of the clamping bolt 10 has, owing to the pressing of the collar 21 against the outer wall 20 by means of the press jaws 27, a spacing a from the longitudinal axis 12 which is smaller than the spacing A of the outer wall 20 from the longitudinal axis 12 at least over a part of the end section 32 of the clamping bolt 10, which part adjoins the connecting section 31 in the direction of the first end 16. The spacing a is preferably smaller, over the entire axial extent of a respective pressing region, than the spacing A. In the exemplary embodiment shown, the spacing A is greater, over the entire end section 32 of the clamping bolt 10, than the spacing a.

In other words, it is thus the case that, when viewing the connecting section 31 and the end section 32 or at least a part of the end section adjoining the connecting section, the outer wall 20 has, as viewed in a longitudinal central section running through the respective pressing region, an undercut form as viewed in the axial direction of the clamping bolt 10 from the first end 16 of the clamping bolt 10. In this case, the undercut is situated in the respective pressing region.

By means of the undercuts formed by the pressing regions, a positively locking connection is produced between the actuation lever 11 and the clamping bolt 10, which positively locking connection counteracts a displacement of the actuation lever 11 in the direction of the first end 16 of the clamping bolt 10.

The pressing regions form depressions, which are spaced apart in the circumferential direction about the longitudinal axis 12, in the outer wall 20 of the clamping bolt 10, which depressions are engaged into by radially inwardly projecting elevations of the collar 21. In this way, a connection between the clamping bolt 10 and the actuation lever 11 is formed which also exhibits positively locking characteristics in the circumferential direction about the longitudinal axis 12.

Instead of three pressing regions which are spaced apart in the circumferential direction, it would also be possible for two or more than three such pressing regions, which are spaced apart in the circumferential direction, to be provided. Then, a corresponding number of two or more than three press jaws 27 are used to form the pressed connection.

The pressing regions are preferably distributed uniformly over the circumference of the outer wall 20, that is to say the angular spacing between successive pressing regions in the circumferential direction is uniform.

The connecting section 31 and the end section 32 together extend over less than 20%, preferably less than 10%, of the total length of the clamping bolt 10. The clamping bolt 10 is of hollow form at least over the end section and the connecting section. The clamping bolt 10 is preferably of hollow form beyond the connecting section 31 in the direction of the second end, for example over a length adjoining the connecting section 31, said length amounting to less than 10% of the total length of the clamping bolt 10 and/or less than the length of the end section 32 and of the connecting section 31 together. It is also possible for the clamping bolt 10 to be entirely of hollow form (=for the entire clamping bolt 10 to be in the form of a hollow shaft).

The end section 32 of the clamping bolt 10 has, at least adjacent to the connecting section 31, a non-circular outer contour owing to the pressed connection of the collar 21 to the connecting section 31 and the resulting plastic deformation of said parts. Toward the first end 16, the clamping bolt 10 may have an increasingly circular cross-sectional form.

A second exemplary embodiment of the invention is illustrated in FIGS. 10 to 12. Said exemplary embodiment corresponds to the exemplary embodiment described above, aside from the differences described below.

A collar of the actuation lever 11 may be omitted in this case. The opening of the actuation lever 11, through which opening the clamping bolt 10 extends, is thus formed by a narrow side of the metal sheet from which the actuation lever 11 is formed. By way of said narrow side, which delimits the opening, of the metal sheet, the actuation lever 11 is pressed against the outer wall 20 of the clamping bolt over the extent of the pressing regions of the outer wall 20 of the clamping bolt. The press fit is thus in turn realized at locations which are spaced apart in the circumferential direction. Between the pressing regions of the clamping bolt 10, which are spaced apart in the circumferential direction and over which said clamping bolt is pressed against the wall, which delimits the opening, of the actuation lever 11, gaps 33 are present between the clamping bolt 10 and the actuation lever 11.

In this exemplary embodiment, the clamping bolt 10 is formed in its entirety as a hollow shaft. It would however also be possible for said clamping bolt to have a cavity which extends from the first end 16 only over the end section 32, the connecting section 31 and a section beyond this, the extent of which in the axial direction is expediently at least 5 mm.

The formation of the press fit is in turn realized by means of a press tool, of which in this case only the press jaws 27 are illustrated. In this case, the press jaws 27 are applied directly to the end section 32 of the clamping bolt 10 and press the latter radially inward at pressing points which are spaced apart in the circumferential direction, preferably at three pressing points which are spaced apart in the circumferential direction. By means of said pressing action, regions comprising the pressing points are pushed radially inward, with plastic deformation. In this way, as viewed in the circumferential direction of the clamping bolt 10, intermediate regions situated between said radially inwardly pressed regions are subjected to plastic deformation which causes them to move radially outward. In this way, flared regions 35 are formed on the clamping bolt. The plastic deformations inward in the circumferential regions of the pressing points and outward in the intermediate regions, that is to say in the flared regions, continue beyond the end section 32, in which the press jaws 27 act on the clamping bolt 10, in the direction of the second end 17 (over a certain part of the longitudinal extent of the clamping bolt 10). This has the effect that, in the regions of the circumferential extent of the intermediate regions, a radial press fit is realized between the outer wall 20 of the clamping bolt and the inner wall of the actuation lever 11 surrounding the opening of the actuation lever 11. The outer wall 20 of the clamping bolt 10 is thus pressed together with the actuation lever 11 over pressing regions which are spaced apart in the circumferential direction.

As viewed in longitudinal central sections of the clamping bolt 10 running through said pressing regions, the outer wall 20 of the clamping bolt 10 is again of undercut form as viewed in the axial direction from the first end 16 of the clamping bolt 10, cf. in particular FIG. 11a.

The pin 29 of the press tool is omitted in this second exemplary embodiment. It would in turn also be possible for use to be made of only two, or more than three, press jaws 27.

FIG. 13 shows a modification of the first exemplary embodiment. Aside from the differences described below, it corresponds to the first exemplary embodiment described on the basis of FIGS. 1 to 9.

Instead of an encircling annular collar, the actuation lever 11 in this modified exemplary embodiment has bent-over lugs 34 which protrude from the main part 22. It is for example possible for three such lugs 34 to be provided, which, in the mounted state on the clamping bolt 10, are pressed by way of the pressing regions, which are spaced apart in the circumferential direction, against the outer wall 20 of the clamping bolt 10. The press tool with the jaws 27 and the pin 29 and the pressing process are in this case the same as those described on the basis of the first exemplary embodiment.

The lugs 34 may be formed for example by way of a punching and subsequent bending process. In the mounted state on the clamping bolt 10, said lugs extend from the main part 22 in the axial direction of the clamping bolt 10 toward the first end 16 of the clamping bolt 10.

By means of the pressing action, it is in turn possible for depressions, which are spaced apart in the circumferential direction, to be formed in the outer wall 20, which depressions are engaged into by elevations, formed as a result of the pressing process, of the lugs 34.

It is also possible for two or more than two lugs 34, arranged in succession in the circumferential direction, to be provided.

LIST OF REFERENCE NUMERALS

1 Casing unit 31 Connecting section
2 Steering spindle 32 End section
3 Steering wheel-side end 33 Gap
4 Support unit 34 Lug
5 Side member 35 Flared region
6 Side member
7 Clamping device
8 Adjustment direction
9 Adjustment direction
10 Clamping bolt
11 Actuation lever
12 Longitudinal axis
13 Clamping part
14 Counterpart clamping part
15 Depression
16 First end
17 Second end
18 Nut 19 Intermediate disk
20 Outer wall
21 Collar
22 Base part
23 Cavity
24 Elevation
25 Abutment shoulder
26 Press tool
27 Press jaw
28 Longitudinal axis
29 Pin
30 Depression

The invention claimed is:

1. A steering column for a motor vehicle, the steering column comprising:
a clamping device, in the open state of which the position of the steering column is adjustable and in the closed state of which the position of the steering column is fixed and which comprises a clamping bolt, which clamping bolt has a longitudinal axis, first and second ends which delimit the clamping bolt in an axial direction, and an outer wall which delimits the clamping bolt in a radial direction, wherein the clamping bolt is rotatable about its longitudinal axis for the opening and closing of the clamping device by means of an actuation lever, through an opening of which the clamping bolt extends, and wherein the clamping bolt has an end section adjoining its first end and has a connecting section which adjoins the end section in the direction of the second end of the clamping bolt and which is situated in the region of the opening of the actuation lever and in the axial extent of which the clamping bolt is connected to the actuation lever by way of a press fit, wherein the outer wall of the clamping bolt has, in the connecting section of the clamping bolt, at least two pressing regions which are spaced apart in the circumferential direction about the longitudinal axis and by way of which the actuation lever is pressed against the outer wall, and in that, as viewed in a longitudinal central section running through the pressing region, the outer wall of the clamping bolt has a smaller spacing from the longitudinal axis of the clamping bolt in each pressing region than at least over a part of that end section of the clamping bolt which adjoins the connecting section.

2. The steering column of claim 1 wherein the connecting section and the end section extend together over less than 20% of the total length of the clamping bolt.

3. The steering column of claim 1 wherein the clamping bolt is of hollow form at least over the end section and the connecting section.

4. The steering column of claim 1 wherein the pressing regions form depressions, which are spaced apart in the circumferential direction about the longitudinal axis, in the outer wall.

5. The steering column of claim 1 wherein the actuation lever has one of a collar and lugs which is/are pressed against the outer wall of the clamping bolt in the pressing regions.

6. The steering column of claim 5 wherein one of the collar and the lugs is/are connected by way of a bend to a base part of the actuation lever, which base part is at right angles to the longitudinal axis of the clamping bolt.

7. The steering column of claim 6 wherein one of the collar and the lugs extend(s) from the base part in the direction of the first end of the clamping bolt.

8. The steering column of claim 1 wherein the clamping bolt has an elevation which forms an abutment shoulder against which the actuation lever, at its side averted from the first end of the clamping bolt, bears.

9. The steering column of claim 1 wherein the actuation lever, which is composed of sheet metal, is pressed, by way of an inner wall which delimits the opening of the actuation lever and which is formed by a narrow side of the sheet metal, against the outer wall of the clamping bolt over the pressing regions of the outer wall of the clamping bolt.

10. A method for producing a steering column for a motor vehicle having a clamping device, in the open state of which the position of the steering column is adjustable and in the closed state of which the position of the steering column is fixed and which comprises a clamping bolt, which clamping bolt has a longitudinal axis, first and second ends which delimit the clamping bolt in an axial direction, and an outer wall which delimits the clamping bolt in a radial direction, wherein the clamping bolt is rotatable about its longitudinal axis for the opening and closing of the clamping device by means of an actuation lever, through an opening of which the clamping bolt extends, and wherein the clamping bolt has an end section adjoining its first end and has a connecting section which adjoins the end section in the direction of the second end of the clamping bolt and which is situated in the region of the opening of the actuation lever and in the axial extent of which the clamping bolt is connected to the actuation lever by way of a press fit, wherein the press fit between the actuation lever and the connecting section of the clamping bolt is formed by way of a radial pressing action by means of press jaws which act in the direction of the longitudinal axis of the clamping bolt.

11. The method of claim 10 wherein the press jaws act on at least two regions of the actuation lever which are spaced apart in the circumferential direction of the clamping bolt and which are situated radially outside the outer wall of the clamping bolt, and said press jaws press said regions of the actuation lever against pressing regions of the outer wall of the clamping bolt, wherein the regions of the actuation lever and the pressing regions of the outer wall of the clamping bolt are plastically deformed and, in the process, depressions are formed in the outer wall of the clamping bolt, into which depressions the pressed regions of the actuation lever engage.

12. The method of claim 10 wherein the clamping bolt has, adjoining its first end, an axially running cavity which extends at least over the end section and the connecting section.

13. The method of claim 12 wherein before the pressing process by means of the press jaws, a pin is inserted, with a free end first, into the cavity, said pin remaining in the cavity during the pressing process.

14. The method of claim 13 wherein the free end of the pin is, during the pressing process, situated in the region of the end section or at the transition between the end section and the connecting section.

15. The method of claim 10 wherein the press jaws act directly on at least two pressing points of the clamping bolt which are spaced apart in the circumferential direction of the clamping bolt, wherein intermediate regions, situated between the pressing points in the circumferential direction, of the outer wall of the clamping bolt which is of hollow form at least over the end section and the connecting section are plastically deformed in a radially outward direction.

* * * * *